United States Patent
Dijkstra et al.

(10) Patent No.: US 8,947,206 B2
(45) Date of Patent: Feb. 3, 2015

(54) METHOD AND A SYSTEM FOR ENABLING A WIRELESS COMMUNICATION BETWEEN A MASTER UNIT AND A SENSOR UNIT

(75) Inventors: Freerk Dijkstra, Hengelo (NL); Per Johan Slycke, Schalkhaar (NL)

(73) Assignee: Xsens Holding B.V., Enschede (NL)

( * ) Notice: Subject to any disclaimer, the term of this patent is extended or adjusted under 35 U.S.C. 154(b) by 823 days.

(21) Appl. No.: 12/940,420

(22) Filed: Nov. 5, 2010

(65) Prior Publication Data

US 2011/0109438 A1 May 12, 2011

(30) Foreign Application Priority Data

Nov. 6, 2009 (EP) .................................... 09175290

(51) Int. Cl.
- *G08B 5/22* (2006.01)
- *G06F 13/00* (2006.01)
- *G08C 19/16* (2006.01)
- *G08B 26/00* (2006.01)
- *H04Q 9/00* (2006.01)

(52) U.S. Cl.
CPC .............. *H04Q 9/00* (2013.01); *H04Q 2209/40* (2013.01); *H04Q 2209/82* (2013.01)
USPC .......... 340/8.1; 710/51; 340/870.01; 340/505

(58) Field of Classification Search
USPC ................. 340/870.06, 539.11, 8.1; 702/104; 710/61, 51; 707/802
See application file for complete search history.

(56) References Cited

U.S. PATENT DOCUMENTS 7,434,731 B2 * 10/2008 Cargonja et al. .............. 235/380
(Continued)

FOREIGN PATENT DOCUMENTS

| WO | WO 2006/041891 A2 | 4/2006 |
|----|----|----|
| WO | WO 2008/088145 A1 | 7/2008 |

OTHER PUBLICATIONS

Swiss Transport Research Conference; "Calculation of Displacements of Measured Accelerations, Analysis of Two Accelerometers and Application in road Engineering"; Martin Arraigada, Empa, Road Engineering/Sealing Comp.; Manfred Partl, Empa Road Engineering/Sealing Comp.; Conference Paper STRC 2006.

(Continued)

*Primary Examiner* — Benjamin C Lee
*Assistant Examiner* — Sigmund Tang
(74) *Attorney, Agent, or Firm* — Miller, Matthias & Hull LLP

(57) ABSTRACT

A method of enabling a wireless communication between a master unit and at least one sensor unit is executed within a frame, the sensor unit having an internal data sampling frequency and being adapted to store samples with corresponding sample sequence numbers. The sensor unit transmits an integrated value to the master unit. The master unit transmits, during a master unit portion of the frame, a data update request message comprising an initial sample sequence number from which integration by the at least one sensor unit has to be carried out. The sensor unit integrates the sample values from the initial sample sequence number to a current sample sequence number and then transmits the integrated sample value and the current sample sequence number. The master unit receives the integrated sample value and current sample sequence number and stores at least the current sample sequence number.

15 Claims, 11 Drawing Sheets

(56) References Cited

U.S. PATENT DOCUMENTS

| | | | |
|---|---|---|---|
| 7,873,673 B2* | 1/2011 | Cleveland et al. | 707/802 |
| 8,515,944 B2* | 8/2013 | Kim et al. | 707/714 |
| 8,593,255 B2* | 11/2013 | Pang et al. | 340/10.1 |
| 8,655,894 B2* | 2/2014 | Gieseke | 707/755 |
| 2005/0264429 A1* | 12/2005 | Hermary et al. | 340/870.06 |
| 2006/0107166 A1* | 5/2006 | Nanda | 714/748 |
| 2009/0192751 A1* | 7/2009 | Kamath et al. | 702/104 |
| 2010/0302028 A1* | 12/2010 | Desai et al. | 340/539.3 |
| 2011/0248865 A1* | 10/2011 | Hong et al. | 340/870.07 |

OTHER PUBLICATIONS

"Attitude Estimation by Compensating Gravity Direction" Lekskulchai Pongsak, et al. Department of Mechano-Informatics, The University of Tokyo 7-3-1 Hongo Bunkyo-ku, Tokyo 113-8656 Japan Nomura Research Institute CREST Program, Japan Science and Technology Corporation.

European search Report issued on Sep. 8, 2013 for Corresponding Application No. 13161077.6.

European Search Report for EP Application No. 09175290.7 dated Dec. 29, 2009 (8 pages).

* cited by examiner

METHOD AND A SYSTEM FOR ENABLING A WIRELESS COMMUNICATION BETWEEN A MASTER UNIT AND A SENSOR UNIT

CROSS-REFERENCE TO RELATED APPLICATION

This application claims priority to European Patent Application No. 09175290.7, filed Nov. 6, 2009, entitled "A Method and A System for Enabling A Wireless Communication Between A Master Unit and A Sensor Unit," which is incorporated herein by reference in its entirety.

FIELD

The invention relates to a method and a system for enabling a wireless communication between a master unit and a sensor unit.

BACKGROUND

Wireless sensor units are known per se, whereby such sensor units may be used for real-time motion tracking. The sensor unit can have a number of sensor channels. A typical inertial sensor unit generally comprises a plurality of sensors, which data may be read out, for example a sensor unit can contain 3-axis accelerometers, 3-axis gyroscopes, 3-axis magnetometers, a pressure sensor and for internal calibration of the measured sensor values one or more temperature sensors.

The channels may be sampled for reading out data by an analog digital converter (ADC) and processed by the processor. The resulting data is sent to the attached wireless transceiver that sends it to a remote master unit where the data may be used in a suitable real-time application, for example data processing, visualization or control.

Because the sensor data is to be transmitted wirelessly, it is inevitable that some data may be lost in transmission. This is a significant problem for all sensors where the quantity of interest is obtained by further data processing involving solving differential equations using the data measured by the sensor, as is the case for inertial sensors when used to measure motion, i.e. position, velocity and orientation, by integration over time of the measured sensor data. In this case, if data is lost in transmission, the integral value is no longer known and the result must be discarded and the integration process re-initialized introducing errors and unknown constants that significantly negatively affect the accuracy of the motion measurement.

SUMMARY OF THE INVENTION

It is an object of the invention to mitigate the above problems. In particular, it is an object of the invention to provide a wireless communications protocol for real-time data transmission of integrable signals without losing accuracy in subsequent real-time processing of such signals. More in particular it is an object of the invention to enable an efficient wireless communications protocol enabling usage of relatively small and cheap RF-chips.

To this end the method according to the invention enables wireless communication between a master unit and at least one sensor unit to be executed within a time interval, or frame, the at least one sensor unit having a sampling frequency for sampling one or more of its sensor channels and for storing resulting samples in a buffer memory together with a corresponding sample sequence number, wherein the at least one sensor unit is adapted to transmit an integrated value to the master unit during a portion of the frame, the method comprises the steps of:

transmitting at least once by the master unit during a master portion of the frame a data update request message comprising an identification of an initial sample sequence number from which integration by the at least one sensor unit has to be carried out;

integrating by the at least one sensor unit the sample values from the initial sample sequence number to a current sample sequence number;

transmitting during a further portion of the frame by the at least one sensor unit the integrated sample value and the identification for the initial and current sample sequence number;

receiving by the master unit the integrated sample value and the identification of the current sample sequence number;

storing in the master unit at least the identification of the initial and current sample sequence number.

It is found that by regularly providing the sensor unit with information regarding the starting point of the integration interval by the master unit, an efficient communication protocol is obtained that enables accurate and reliable real-time data acquisition that is fully robust against data loss inherent to the wireless medium. It will be further appreciated that it is not necessary that the sensor unit is arranged to receive a data update request every frame from the master unit.

In particular, the sensor unit is enabled to transmit at any time the integration value since the last received value by the master, and hence any sensor value received by the master is accurate and although data values may be occasionally lost in wireless transmission this will not significantly impact the accuracy of the use of the data in solving the differential equation by integration, and it will remove the need for re-initializing the integration process.

An additional advantage of the invention is that, if not all the data values are needed for recording, e.g. in a real-time process, there is no need to retransmit any sensor data saving bandwidth over the wireless medium and enabling the use of more sensor units and/or sensor data and/or at a higher update rate over a given bandwidth.

An additional advantage of the invention is that, if all data values are needed for recording purposes, this can be implemented without sacrificing the real-time requirement.

An additional advantage of the invention is that the sensor unit transmission does not depend on the reception of an acknowledgement or broadcast from the receiving master unit. Rather the sensor unit can operate relatively autonomously, reducing the impact of any failed acknowledgement transmissions.

An additional advantage of the invention with respect to recording purposes is that, the receiving end, being the host application can determine what data is still required and therefore has to be retransmitted and what data is not, allowing for efficient retransmission of selected data portions.

It will be appreciated that in a preferred embodiment the sampling frequency is constant and is a-priori known. In this case the actual start and end integration moments may be substituted with a sample sequence number, in case of temporal integration.

However, it is also possible to practice the invention with generic starting and ending integration moments (times). It will be appreciated that those skilled in the art readily appreciate which type of signals may be conceived to be integrated. For example, a value sensed by the at least one sensor may relate to a variable dependent on time. In this case the integration may be carried out over time. In another example, a value sensed by the at least one sensor may relate to a variable dependent on a displacement, or a velocity, etc. In this case the integration may be carried out with respect to the displacement or the velocity, etc.

Preferably, the sampling frequency of the sensor is substantially higher than 120 Hz, typically between 0.5 kHz and 50 kHz, depending on the application, and the measured data is processed to detect predefined events in the data within the transmission interval (frame). In particular, the data can be processed for one or more predefined event detections, and adapted to transmit the occurrence, of the event together with a time or sample sequence number within the transmission interval.

In an embodiment of the method according to the invention, wherein a plurality of wireless sensor units is provided, the method comprises the steps of:

broadcasting by the master unit a mutual data update request for the said plurality of sensor units, said data update request comprising an identification of an initial sample sequence number for each sensor unit or some sensor units separately from which integration of sample values for each sensor unit has to be carried out;

assigning a frame portion to each sensor unit within the frame;

transmitting by each sensor unit during its assigned frame portion the integrated sample value and the identification of the initial and the current sequence number at the sensor unit;

receiving by the master unit the integrated sample values from each sensor unit and the identification of the current sample sequence numbers;

storing in the master unit at least the identification of the initial and current sample sequence numbers for each sensor unit.

It is found to be preferable instead of a sequential sensor unit addressing by the master unit to implement a simultaneous addressing by mean of the mutual broadcast data update request message. In response to this broadcast message each sensor unit would carry out due integration of the samples stored in the buffer memory and would broadcast within its own timeslot the resulting integrated sample.

In a still further embodiment of the method according to the invention sampling moments occurring in accordance with the sampling frequency are synchronized with respective start and end moments of the frame.

In a still further embodiment of the method according to the invention delayed response to the received broadcast message from the master unit is enabled to implement transmissions in assigned timeslots in a portion of the frame for each sensor unit separately, the method comprising the steps of:

buffering samples together with their respective sequence numbers in a buffer memory of the sensor unit;

retrieving a sequence number from the broadcast message;

using the samples stored in the buffer memory for generating the integrated value of the variable from the sequence number retrieved from the broadcast message up to the current sequence number.

It is found that by implementing suitable buffering of the samples together with the sequence number, it is possible to carry out due integration of the sample values with a delay, which may be advantageous when transmission of the initial broadcast message has failed.

In a still further embodiment of the method according to the invention the data update request message is used for transmitting settings data to the at least one sensor unit.

Those skilled in the art will appreciate that the invention is not limited to inertial sensors. From a generic point-of-view, the invention can be applied to any integrable signal, the solution to a differential equation, that can be measured by a sensor unit. Generally a value at time step k denoted by $v_k$ that is constructed from a sample $s_k$ using the following differential equation:

$$v_k = f(v_{k-1}, s_k, T_k)$$

with the interval:

$$T_k = t_k - t_{k-1}$$

A subset of these types of equation are values that are the result of an integration of another value, e.g. over time:

$$v = \int_{t_1}^{t_2} s\, \delta t$$

In principle, the following variables may be determined from the sensor unit data:

Velocity from acceleration.
Translation from velocity.
Angular velocity from angular acceleration.
Angle from angular velocity.
Coupled induction flux from electrical voltage.
Pressure impulse from pressure.
Impulse from force.
Electrical charge from electrical current.
Displaced volume from nozzle output.
Thermal energy from heat.
Smooth Rectified EMG from raw EMG.

As a consequence of the implemented behavior of the sensor unit, the sensor unit will keep integrating and transmitting the Data responses even when the Data update request was not received, e.g. because of a transmission failure of the broadcast of the master unit (e.g. caused by temporarily out-of-range, or interference).

The Data update request does not have to be sent every frame. Instead, it can be used as a means for communicating settings to the sensor units for example.

Also, the size can be kept to a minimum by letting it contain only the sequence number of one sensor unit at a time. So as an example: for 4 sensor units, one in every four Data update requests contains the new sequence number for a particular sensor unit.

It will be appreciated that the sensor unit could be implemented so that it does not require a Data update request from the master unit. By storing at every time step i only the integration value $v(\tau_0, \tau_i)$ (so the older data is deleted), the sensor unit can keep sending values $v(\tau_0, \tau_i)$ by creating it from the previous integration value:

$$v(\tau_0, \tau_i) = v(\tau_0, \tau_{i-1}) + v(\tau_0, \tau_i)$$

However, there is a practical limitation of the number of bits that are used to represent the value in memory and in the Data response and the period for which the integration value is determined because of summation of errors. Therefore, occasionally the Data update request should still be received so the value stored can be $v(\tau_M, \tau_i)$ with $\tau_M$ the sequence number supplied in the last message from the master unit.

In a still further embodiment of the method according to the invention, the method is adapted for enabling read-out of integrated sample values correlated in time, the method comprising the steps of:

recognizing a synchronization event by the sensor units;

retrieving the buffered samples from respective buffer memories of the sensor units except for the last sample;

integrating the respective sample values and wirelessly transmitting the resulting integration values to the master unit.

Preferably, the synchronization event is the broadcast data update request message.

In a still further embodiment of the method according to the invention one or more retransmission slots are assigned per frame, the broadcast message from the master unit comprising a frame counter adapted to indicate the frame number for which data are up to date, said frame counter being updated for each received broadcast message, the method comprising the step of:

removing data from the buffer up to the frame corresponding to the received frame number;

retransmitting integration value corresponding to the oldest sample remaining in the buffer.

It can be easily envisioned that, without losing the generality the implementation of the assignment of a slot to a sensor unit can be expanded in following ways to implement different data output rates per sensor unit:

i. To allow for higher granularity of the data, more slots could be assigned to a single sensor unit.

ii. Slots can be shared by sensor units in such a way that they take turn in transmitting their data.

It is also possible that wherein the retransmission slots are shared by the sensor units, in this case the method comprises a further step of:

indicating in the broadcasting message in which order the sensor units are to transmit their individual data.

It will be appreciated that in the embodiments of the method described with reference to the foregoing no retransmissions were done of missing intervals. If a transmission failed, the master unit can still obtain an accurate real-time value of the integrated quantity of interest because the interval over which the integration value was determined is incremented by one interval at the sensor unit. This is illustrated in the following example:

1. Successful transmission of $v(\tau_0,\tau_1)$ and the value is processed at the master unit.

2. Failed transmission of $v(\tau_0, \tau_2)$. No processing of new data at the master unit.

Successful transmission $v(\tau_0, \tau_3)$. This value is used by the processing at the master. Since no information is lost, the value $v(\tau_0, \tau_2)$ is incorporated in the transmitted value the further processing at the master unit can continue without the need for a re-initialization of the processing. So for real-time processing no retransmission is required in a sense that the same integration value is retransmitted.

However, for recording purposes no hard real-time requirement may exist. So, if in the example the value $v(\tau_1,\tau_2)$ is required for recording, it must be retransmitted.

Accordingly, in a further embodiment of the method according to the invention further comprising the steps of:

for every sensor unit storing integration intervals and corresponding integrated sample values in a dataset;

decreasing the dataset upon an event of data recording;

combining pairs of known integration values for determining a missing interval value.

Because of the dependency on the time interval, this means that intermediate values can be reconstructed as explained in the following.

Let us suppose that $v(\tau_1,\tau_2)$ denotes the resulting value for the interval $[\tau_1,\tau_2]$ and likewise $v(\tau_2,\tau_3)$ denotes the resulting value for the interval $[\tau_2,\tau_3]$ with $\tau_1<\tau_2<\tau_3$. Since the values depend on the interval, a value $v(\tau_1,\tau_3)$ can be calculated as well.

Now, assume that the values $v(\tau_1,\tau_2)$ and $v(\tau_1,\tau_3)$ are available but that the 'intermediate' value $v(\tau_2,\tau_3)$ was required also. Because of the characteristic of the equation this value can be constructed:

$$v(\tau_1,\tau_3)-v(\tau_1,\tau_2)=v(\tau_2,\tau_3)$$

In the same way other operations are possible as well. Some examples:

$$v(\tau_1,\tau_2)+v(\tau_2,\tau_4)=v(\tau_1,\tau_4)$$

$$v(\tau_1,\tau_4)-v(\tau_1,\tau_2)-v(\tau_2,\tau_3)=v(\tau_3,\tau_4)$$

The '+' and '−' operation in the examples are only for clarification: for practical implementations as used in strapdown integration the operations are more complex, but still follow the earlier given expression:

$$v_k=f(v_{k-1},s_k,T_k)$$

In the system according to the invention, comprising a master unit and an at least one sensor unit, wherein the master unit and the at least one sensor unit are arranged to communicate using a wireless communication, said at least one sensor unit having one or more data channels and a buffer memory and being further arranged for sampling the one or more of its data channels with a data sampling frequency and for storing resulting sample in the buffer memory together with a corresponding sample sequence number, wherein the at least one sensor unit is further arranged to transmit an integrated samples value to the master unit during a portion of the frame, the master unit is arranged to transmit during a master portion of the frame a data update request message comprising an identification of an initial sample sequence number from which integration by the at least one sensor unit has to be carried out;

the at least one sensor unit is arranged to integrate the sample values from the initial sample sequence number to a current sample sequence number and to transmit during a further portion of the frame the integrated sample value and the identification for the initial sample sequence number;

the master unit is further arranged to receive the integrated sample value and the identification of the current sample sequence number and to store at least the identification of the initial sample sequence number.

These and other aspects of the invention will be discussed in more detail with reference to drawings, wherein like reference numerals refer to like elements. It will be appreciated that the drawings are presents for illustrative purposes and may not be used for limiting the scope of the appended claims.

DETAILED DESCRIPTION OF THE DRAWINGS

Figure 1:
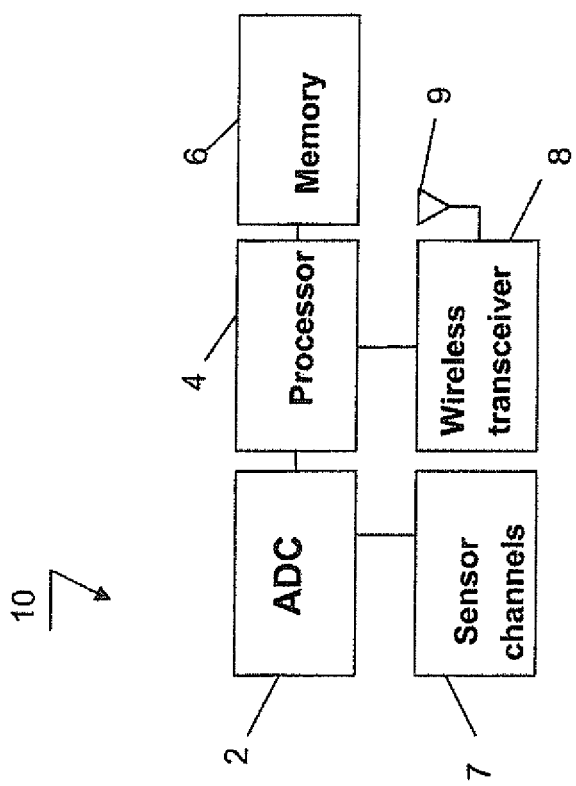
FIG. 1 presents in a schematic way an embodiment of a wireless sensor unit.

Methods to deal with (short) periods of data loss in wireless transmission apply some type of interpolation of the data. Such a method is prone to large errors, especially in situations with relatively large periods of data loss in combination with a dynamic signal. Furthermore, interpolation can only be performed once at least one more recent data value is received, causing a delay in processing.

Methods to reduce the probability of losing data in wireless transmission include schemes of acknowledgement of data reception and retransmission of data in the case of no received acknowledgement. Other methods may include redundant encoding of the data or reconstruction of the data based on checksums, forward error corrections and similar methods. However, none of these methods can mitigate data loss, only reduce the likelihood of data loss occurring at the cost of the need to transmit more data over the wireless medium.

Since data loss is often caused by interference of other transmitters in the same frequency bands and/or because the signal to noise ratio is too low, e.g. in case the distance to the receiver is too large, another method to reduce data loss is to increase the transmitted power, which will lower the probability to data packet loss. However, the transmission power cannot be increased indefinitely since the transmitted power is limited by (international) regulations on radio transmissions and increasing the transmission power will cause the battery of mobile devices to run out sooner.

Since the errors caused by data loss is so severe in case that the quantity of interest is derived from further data processing involving solving a differential equation using the data measured by the sensor, one must reserve a significant portion of the available wireless bandwidth for reducing the probability of data loss in the wireless transmission. This may significantly deteriorate the achievable update rate and/or the maximum number of sensor units that can be used simultaneously for a given wireless system. Additionally such measures may require a wireless system with a higher performance, and thus higher cost, for a given update rate and maximum number of sensor units.

For example, commonly used low-power, low-cost, wireless standard technologies have a maximum of 250 kbps bandwidth per frequency channel, an example of such a device is the CC2520 from Texas Instruments. A sample of a sensor channel may be typically expressed by at least two bytes, bringing the total at 20 bytes of data per sample for a typical inertial sensor unit. It is preferable to set the sample rate to a relatively high value. Typical sample rates are minimally 120 Hz for human motion applications up to several kHz for machine motion that has to cope with relatively low frequency vibrations. Typically, for wireless transmission some 6 bytes will be added to each packet by the physical layer. So, if each sample is transmitted wirelessly, at a sample frequency of 120 Hz, the minimal requirement for the data rate is 120 Hz×26 bytes×8 bits≈25 kbps.

In a network of sensor units each sensor unit is typically assigned a timeslot in which it is allowed to transmit, to reduce the probability of collisions and data loss. In theory this time division multiple access (TDMA) mechanism means that the maximum number of sensor units at this sample rate that can be connected to a single master unit is 10. This means that a typical full body motion capture system based on inertial sensor units, that requires 17 sensor units will not be implementable with a master unit that receives only on one frequency channel. At least 2 frequency channels are required.

Multiple-frequency-channel systems may be envisaged, e.g. a master unit that has a number of independent transceivers each operating on a different frequency channel. However, this reduces the possibility to choose a frequency channel that is not occupied by another wireless device and it also increases the probability that other wireless devices will interfere. It also reduces the number of independent systems that can operate in the same area and increases the cost of the system.

In practice the indicated maximum number of sensor units that can be used simultaneously will be even lower as the timing required to implement the TDMA mechanism is distributed. This means that each sensor unit must determine by itself when to transmit. Because clocks of sensor units might differ a little, some guard time must be introduced to prevent a sensor unit from transmitting when another sensor unit has not finished its transmission yet. Although there are appropriate time synchronization mechanisms known in the art, even a little guard time will reduce the number of sensor units to 9 or less.

The amount of bandwidth that must be reserved for retransmission of lost packets can be estimated by considering that in most wireless protocols acknowledgement is done by an acknowledge mechanism in which the receiver sends a response back to the sensor unit when the master properly received the packet from the sensor unit.

A commonly used basic method is as follows:
1. The sensor unit waits for the assigned timeslot.
2. The sensor unit transmits a packet.
3. It is checked whether the acknowledge from the receiver was received. If the acknowledge was received the sensor unit waits for its next assigned timeslot.
4. The acknowledge must be received within a certain time-out. If the time-out was not exceeded yet, the loop continues and returns to step 3.
5. If the acknowledgement was not received, it is checked how often this has happened this timeslot. A parameter is the maximum number of retries that is allowed. If the number of retries is not exceeded yet, the flow returns to 2 and the packet is re-transmitted.
6. If the maximum number of retries was reached, the packet, ad thereby the data contained in the packet was considered lost in this timeslot and the flow continues to waiting for the next assigned timeslot.

If an acknowledgement needs to be awaited, the timeslot needs to be extended.

For one retransmission the layout of the timeslot will look like:

| Data packet | Acknowledgement | Retransmission |
---

For two retransmissions the layout of the timeslot will look like:

| Data packet | Acknowledgement | Retransmission | Acknowledgement | Retransmission |

Assuming an acknowledgement of 2 bytes (again with an added 6 bytes for the radio header), this means that the timeslot will be: 26+8+26=60 bytes wide for a timeslot in which one retransmission is allowed and 26+8+26+8+26=94 bytes if two retransmissions are allowed.

The complete acknowledge period must be awaited because the master unit might be transmitting the acknowledge even if the sensor unit is unable to receive it. Otherwise the sensor unit might be retransmitting while the master unit is still transmitting the acknowledge. However, if it is assumed that the probability of the acknowledgement sent by the master unit is not received at the sensor unit can be neglected, optionally a shorter timeout than the acknowledgment period could be implemented. However, this timeout will have to be at least the 6 bytes of the preamble sequence. So little may be gained by that: the timeslot for one retransmission and two retransmissions will be 58 bytes and 90 bytes wide respectively. Accordingly, retransmission by means of acknowledgement in the same timeslot is not feasible because it will greatly reduce the capacity of the network; for one retransmission the maximum number of sensors units at 120 Hz would be 10×26/60=4 and for two retransmissions it will be 10×26/90=2. This means that almost no capacity is left in the system for two retransmissions. It is also important to note that a retransmission is absolutely no guarantee that all data is received. The effect of retransmission is greatly reduced because the transmission-failure probability of is not the same for the retransmission in practical situations: low cost ISM radio transceivers operate in a frequency band with a lot of interferers. These interferers will be transmitting in certain time periods more than in other. In other words this means: the conditional probability of the retransmission failing when the first transmission failed is much higher than the average overall transmission failure probability.

For a low cost ISM transceiver a transmission failure rate of around 10% and a retransmission conditional failure rate of 50% is no exception under non-ideal practical conditions, assuming a normal distribution this already may results in around 0.2% of occasions with 3 or more failed consecutive transmissions/acknowledge cycles and a resulting packet-loss probability of 5%, which is not uncommon in practical wireless communications.

Summarizing, even with a retransmission scheme in place, considerably reducing the capacity of a network from a theoretical maximum of 10 to 4 for a given low cost ISM radio, data loss will occur, causing unacceptable loss of accuracy in application using wirelessly transmitted sensor data in the solving of a differential application, such as for example tracking motion (position and orientation) by means of integrating inertial sensor data).

FIG. 1 presents in a schematic way an embodiment of a wireless sensor unit. A schematic set-up 10 of a wireless inertial sensor unit is given. The sensor unit can have a number of sensor channels 7. A typical inertial sensor unit can contain 3-axis accelerometers, 3-axis gyroscopes, 3-axis magnetometers a pressure sensor and a temperature sensor.

The channels 7 are sampled by and analogue digital converter 2 (ADC) and processed by the processor 4. The resulting data is sent to the wireless transceiver 8 that sends it to a remote master unit using a suitable transmission means 9. At the master unit the data may be used for real-time data processing. The sensor unit also comprises a buffer memory 6 wherein samples together with sample sequence number are stored.

Figure 2:
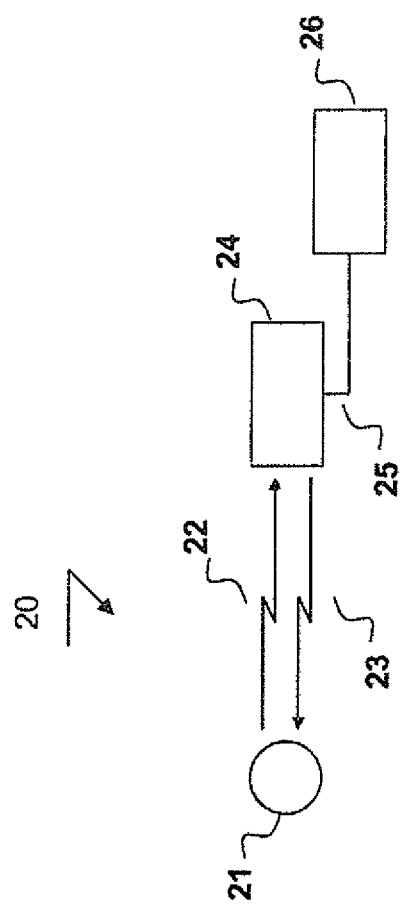
FIG. 2 presents in a schematic way an embodiment of a sensor unit-master unit wireless communication according to an aspect of the invention.

FIG. 2 presents in a schematic way an embodiment of a sensor unit-master unit wireless communication according to an aspect of the invention. Communication may be enabled as follows. A wireless sensor unit 21 may generate data and may communicate this data wirelessly to a master unit 24. The data may be an integration value as described before. The wireless transmission may be initiated by the master unit 24 that sends a Data update request 23. Consequently, the sensor unit starts sending Data responses 22 in predefined intervals containing the up-to-date integration value of the samples corresponding to a predefined interval stored in the buffer memory of the sensor unit. It is noted that the master unit differs from the sensor unit because it has a connection 25 to an External Data processor Device 26 (e.g. that implements real-time data processing and optionally recording). It can be envisioned that the master unit and sensor unit are implemented to be equivalent from a hardware point of view and that the role of master unit and sensor unit could be switched by connecting the External Data processor and reconfiguring the software.

Figure 3:
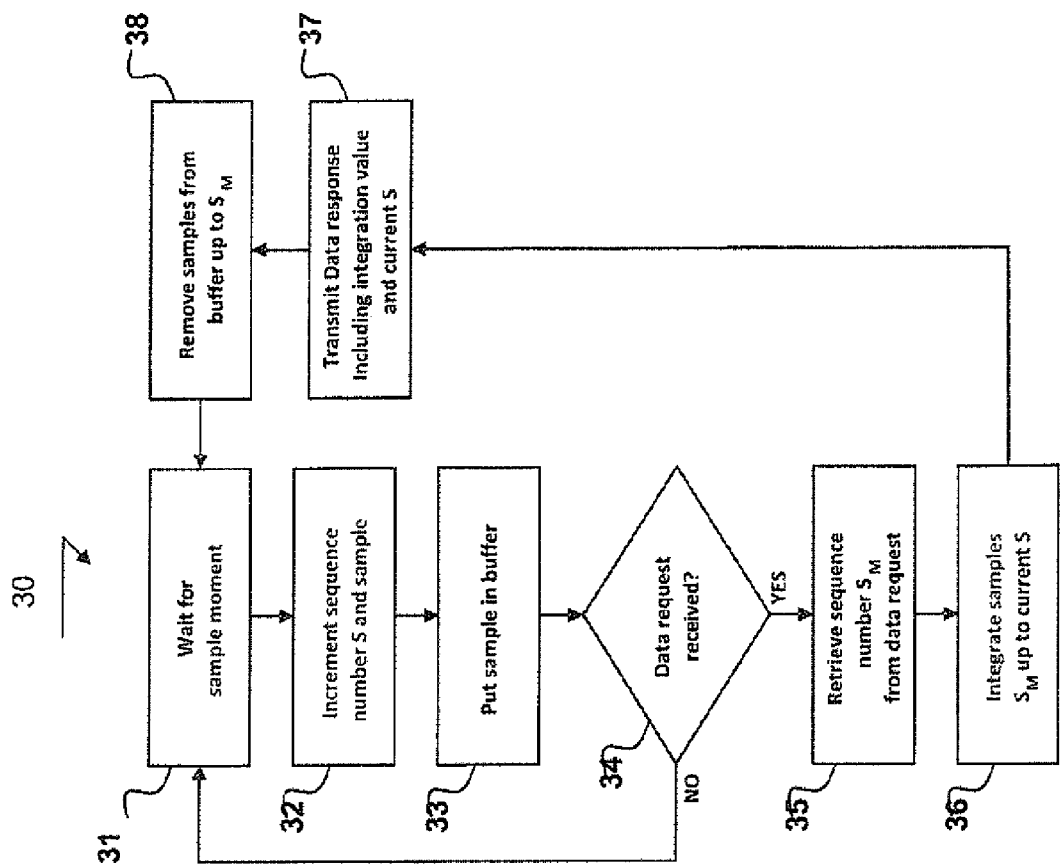
FIG. 3 presents in a schematic way an embodiment of an operation of a wireless sensor unit in the method according to the invention.

FIG. 3 presents in a schematic way an embodiment of an operation of a wireless sensor unit in the method according to the invention. In this particular embodiment the sensor unit sends data indications in predefined intervals (the data output-rate) and uses the data update requests from the master to obtain a new the starting point of the integration. The starting point of the integration could be changed for example for reasons of numerical precision or fluctuating bias. Additionally, the data update request from the master could contain changes in data-output intervals and/or bias information to be used at the sensor unit for its internal calculations.

At the sensor unit, all samples have a sequence number. When an integration value is transmitted, the sequence number of the last sample used to construct the integration value is supplied. At the sensor unit the flow is as follows:

Item 31: The sensor unit waits for the sample moment.

Item 32: When the sample moment occurs, the current sequence number S is increased and the sensor unit samples the data channels.

Item 33: The sample and its sequence number are buffered in memory. Optionally, the samples within an interval could be integrated at this step. The advantage of this preferred embodiment is that the buffer memory for the interval can be much smaller, i.e. one integrated value.

Item 34: It is checked whether a data update request was received from the master. If not, the flow continues to determine whether it is time to transmit another data indication.

Item 35: If the data update request was received, the sequence number $S_M$ is retrieved from the message.

Item 36: Using the samples stored in the buffer, an integration value is constructed by integrating all samples from $S_M$ up to the current sample S.

Item 37: It is checked whether it is time to transmit another data indication. If not, the flow returns to waiting for the next sample moment.

Item 38: The integration value is transmitted in a data packet including the current sequence number S.

Item 39: The samples up to $S_M$ are removed from the buffer. Note that if no new $S_M$ was received, nothing is actually removed at this point.

Figure 4:
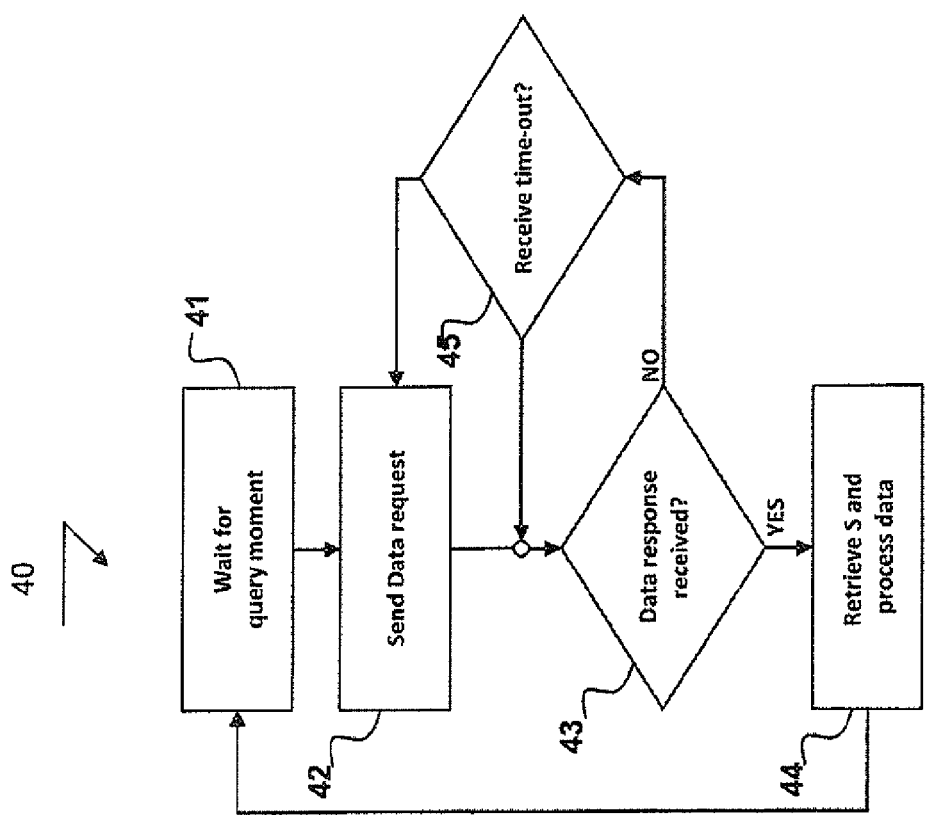
FIG. 4 presents in a schematic way an embodiment of an operation of the master unit in the method according to the invention.

FIG. 4 presents in a schematic way an embodiment of an operation of the master unit in the method according to the invention. The master is in control of starting and stopping the data transmission at the sensor unit, but the sensor unit will transmit its integration values independently in predefined intervals. The flow at the master unit is as follows:

Item 41: The master unit waits for the next data indication from the sensor unit.

Item 42: When the indication is received, the current sequence number is retrieved and the data is processed.

Item 43: It is checked whether an update is to be sent to the sensor unit. If not the master unit waits for the next data indication.

Item 44: If a data update request was required, the master unit transmits this to the sensor unit.

Figure 5:
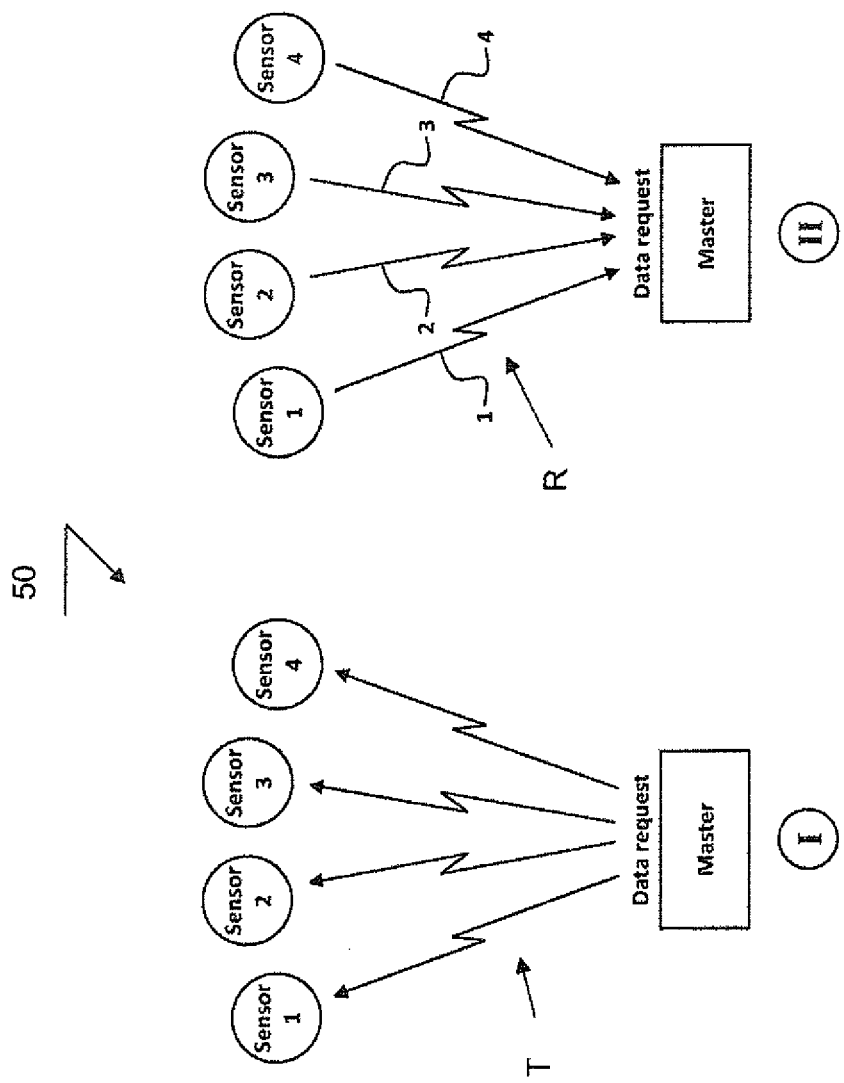
FIG. 5 presents in a schematic way an embodiment of a multiple sensor unit network.

FIG. 5 presents in a schematic way an embodiment of a multiple sensor unit network. In this set-up each sensor unit could receive a Data update request from the master unit independently. In case the master unit is to retrieve the data of a number of sensor units that are uncorrelated, the basic sequence as described with reference to FIGS. 3 and 4 can be successively executed for each sensor unit.

However, this may be not a good approach since the Data update request is to be sent to each sensor unit and will therefore consume valuable airtime.

Accordingly, in the improved sequence the master unit is arranged to broadcast a mutual data update request message T to all sensor units simultaneously. As a response thereto all sensor units transmit integrated values as respective responses R, which are carried out in respective assigned timeslots. Preferably a frame is divided into a master unit portion for broadcasting the data update request message and a number of individual sensor unit's timeslots. Preferably, the sample moments are synchronized with the start and the end of the frame and respective timeslots. It will be appreciated that this feature is not compulsory, however, due to synchronization the received samples are more up-to-date and the overall timing is more accurate.

Figure 6:
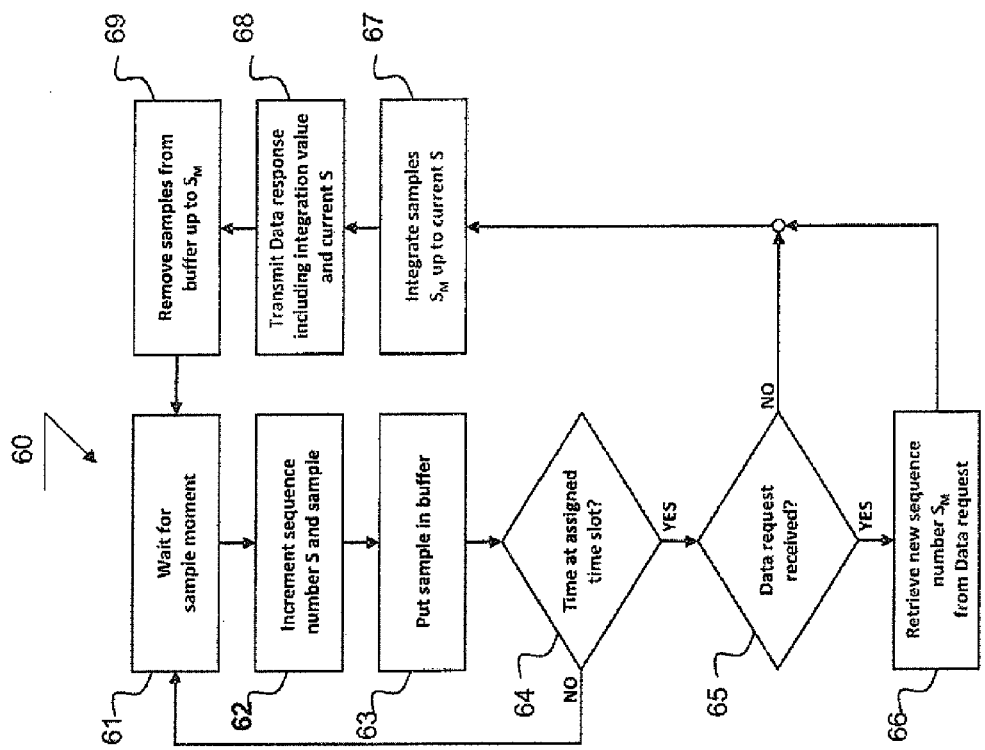
FIG. 6 presents in a schematic way an embodiment of a delayed response by the sensor unit to the received broadcast from the master unit.

FIG. 6 presents in a schematic way an embodiment of a delayed response by the sensor unit to the received broadcast from the master unit required to implement the transmission of the integration value of a sensor unit in an assigned timeslot and to have the sensor unit not depend on whether the data update request of the master unit actually contained an sequence number update or even was actually received at all. The sensor unit's flow is as follows:

Item 61: The sensor unit waits for the sample moment.

Item 62: When the sample moment occurs, the current sequence number S is increased and the sensor unit samples the data channels.

Item 63: The sample and its sequence number are buffered in memory. Optionally, the samples within an interval could be integrated at this step. The advantage of this preferred embodiment is that the buffer memory for the interval can be much smaller, i.e. one integrated value.

Item 64: It is checked whether the assigned timeslot has arrived. If not, the flow returns to waiting for a sample moment.

Item 65: It is checked whether a Data update request was received from the master unit and if so whether it contained a sequence number update for the sensor unit.

Item 66: If the Data update request was received and if it contained a sequence number update, the new sequence number $S_M$ is retrieved from the message.

Item 67: Using the samples stored in the buffer, an integration value is constructed by integrating all samples from $S_M$ up to the current sample S.

Item 68: The data is transmitted. Since the sensor unit will transmit its data even when no data update request was received, the message is a data indication containing the sequence number of both the first and the last sample used to determine the integration value.

Item 69: The samples up to $S_M$ are removed from the buffer.

It will be appreciated that when the Data update request was not received, the old value of the $S_M$ is used. Consequently, the buffer is not emptied at step 69 in the flow.

Figure 7:
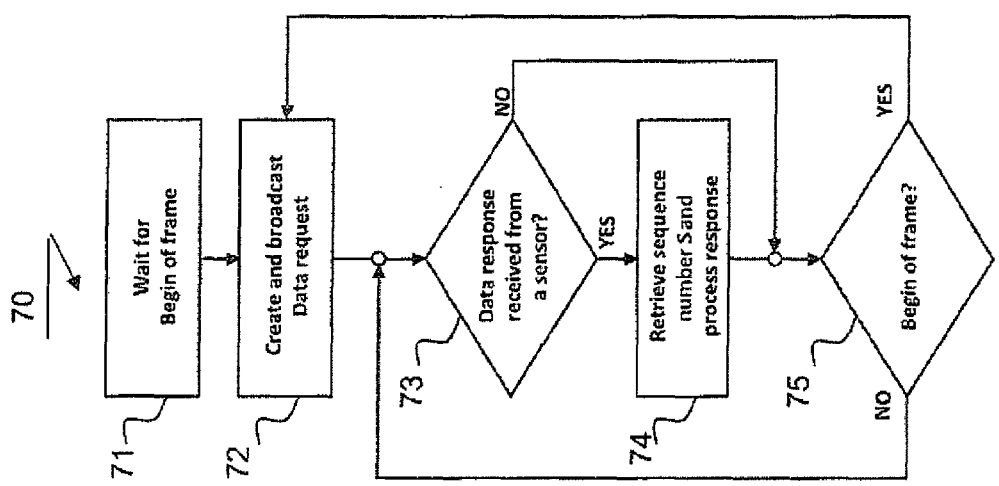
FIG. 7 presents in a schematic way an embodiment of a corresponding operation of the master unit.

The result is that the transmitted Data indication of the sensor unit contains the most up-to-date integration value while still a TDMA transmission scheme is used. FIG. 7 presents in a schematic way an embodiment of a corresponding operation of the master unit.

Item 71: The master unit waits for begin of the frame.

Item 72: At begin of the frame the master unit creates a data update request and broadcasts this to the sensor units. In the data update request the sequence numbers are given for all the sensor units. Alternatively, if transmission time is sparse and should be minimized for the data update request, the method supports supplying the sequence numbers only for some of the sensor units.

Item 73: The master unit awaits the Data indications from the sensor units.

Item 74: If a Data indication was received from one of the sensor units (i.e. in the assigned timeslot), the sequence number is retrieved and stored to be used later on when constructing one of the next data update request in which the sequence number for that particular sensor unit is added. The contained data is processed to be used by an application.

Item 75: It is checked whether begin of the frame was reached again. If so, the flow returns to the step in which the data update request is created. If the end of the frame was not reached yet, there could still be Data indications received from the sensor units and the master unit keeps waiting for these.

As a consequence of the implemented behavior of the sensor unit, the sensor unit will keep integrating and transmitting the Data indications even when the data update request was not received, e.g. because of a transmission failure of the broadcast of the master unit (e.g. caused by temporarily out-of-range, or interference) or when the received data update request did not contain a sequence number update for the sensor unit as described above.

Consequently, the data update request does not have to be sent every frame. Instead, it can be used as a means for communicating settings or other data to the sensor units for example.

Specifically, it is found to be advantageous to transmit to the sensor unit data containing information regarding the sensor properties, such as for example calibration errors like a sensor offset. Such sensor errors are important for the integration process and it may be needed to account for such data in the integration process. It is theoretically impossible to do such compensation at the master unit in case of long periods of link loss between sensor unit and master unit because approximation (e.g. linearization) of the differential equation is no longer valid for longer times.

In detail, the integration value is dependent on a priori unknown sensor parameters, such as for example a gyroscope bias. Generally these parameters are small and will result in linear predictable errors in the integration value that can be used to correct the integration value at the master unit by, for example, employing a Kalman filter. However, instead of correcting at the master unit, the parameter could also be sent back to the sensor unit to the master unit directly or periodically to improve the accuracy of the integration process. This is particularly useful in case the relation between the integration value and the parameter depends on the history. However, if the parameter, such as for example the gyro bias is not readily available a priori, or during extended periods of link loss, this method may not work satisfactorily because the approximation made is no longer valid. In such a case the Jacobian of the integration value and the parameter could be transmitted from the sensor unit to the master unit. In that case, the Jacobian includes the effect of the history to a first order and can therefore be used to correct the integration value resulting in an improved estimate of the parameter.

As an additional advantage the size of the data update request from the master unit can be kept to a minimum by letting it contain only the sequence number of one sensor unit at a time. So as an example: for 4 sensor units, one in every four data update requests contains the new sequence number for a particular sensor unit.

The master unit can reconstruct the integration values by using the equations as presented below $$v(\tau_0,\tau_1) \qquad\qquad 1.$$

$$v(\tau_0,\tau_2) \Rightarrow v(\tau_1,\tau_2)=v(\tau_0,\tau_2)-v(\tau_0,\tau_1) \qquad 2.$$

$$v(\tau_0,\tau_3) \Rightarrow v(\tau_2,\tau_3)=v(\tau_0,\tau_3)-v(\tau_0,\tau_2) \qquad 3.$$

$$v(\tau_0,\tau_4) \Rightarrow v(\tau_3,\tau_4)=v(\tau_0,\tau_4)-v(\tau_0,\tau_3) \qquad 4.$$

$$\text{etc.} \qquad\qquad 5.$$

So at the master unit the values $v(\tau_{i-1},\tau_i)$ (i.e. $v(\tau_0,\tau_1)$, $v(\tau_1,\tau_2)$, $v(\tau_2,\tau_3)$, etc. in the example) can be constructed. If the previous transmission failed, there will be a lengthened interval at the next time step: $v(\tau_{i-2},\tau_i)$. For example:

$$v(\tau_0,\tau_1) \qquad\qquad 1.$$

$$v(\tau_0,\tau_2)\to\text{failed!} \qquad\qquad 2.$$

$$v(\tau_0,\tau_3) \Rightarrow v(\tau_1,\tau_3)=v(\tau_0,\tau_3)-v(\tau_0,\tau_1) \qquad 3.$$

This will give the values $v(\tau_0,\tau_1)$, $v(\tau_1,\tau_3)$. So due to the failed transmission of $v(\tau_0,\tau_2)$ the value $v(\tau_2,\tau_3)$ could not be determined. If this value, $v(\tau_2,\tau_3)$ is required for recording purposes, it must be retransmitted, as discussed below.

In theory, the sensor unit would never require a data update request from the master unit. By storing at every time step i only the integration value $v(\tau_0,\tau_i)$, the sensor unit can keep sending values $v(\tau_0,\tau_i)$ by creating it from the previous integration value:

$$v(\tau_0,\tau_i)=v(\tau_0,\tau_{i-1})+v(\tau_{i-1},\tau_i)$$

However, there is a practical limitation of the number of bits that are used to represent the value in memory and in the Data response. Therefore, occasionally the data update request should still be received so the value stored can be $v(\tau_M,\tau_i)$ with $\tau_M$ the sequence number supplied in the last message from the master unit.

Figure 8:
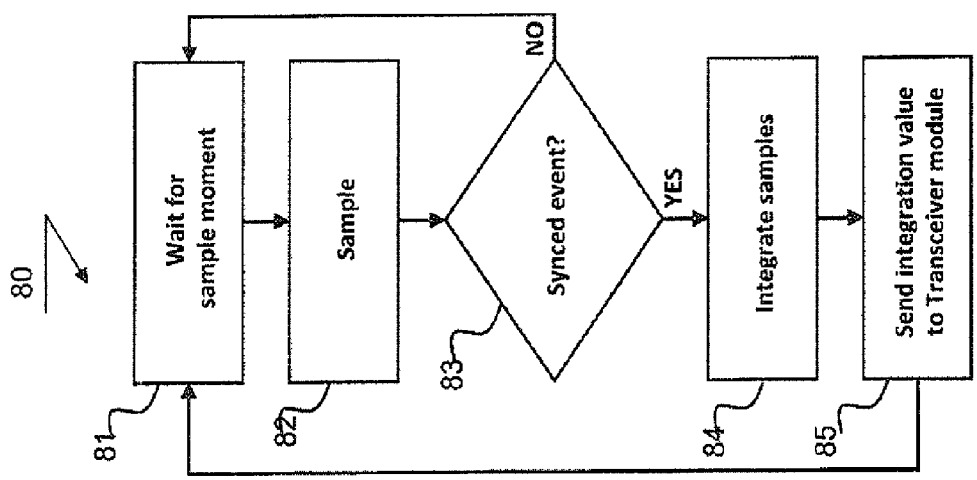
FIG. 8 presents in a schematic way an embodiment of a wireless sensor unit upon receipt of the data update request broadcast.

FIG. 8 presents in a schematic way an embodiment of a wireless sensor unit upon receipt of the data update request broadcast in case the sensor unit is to be part of a group of sensor units that are all to determine the integration values at the same instance in time but transmit their values in their assigned timeslot later on in the frame.

Item 81: The sensor unit waits for the sample moment.

Item 82: When the sample moment occurs, the sensor unit samples the data channels. The sample is buffered in memory for processing later on.

Item 83: It is checked whether a synchronization event has occurred. If this is not the case, the next sample moment is awaited.

Item 84: If a synced event occurred, all the buffered samples are retrieved from memory and used to calculate the integration value. All the samples are removed from the buffer with the exception of the last sample which is required for the next integration.

Item 85: The integration value is transmitted to the wireless Transceiver module and the sensor unit again waits for the next sample moment.

It is noted that the synchronization event can be the start of the frame, the received broadcasted data update request.

Figure 9:
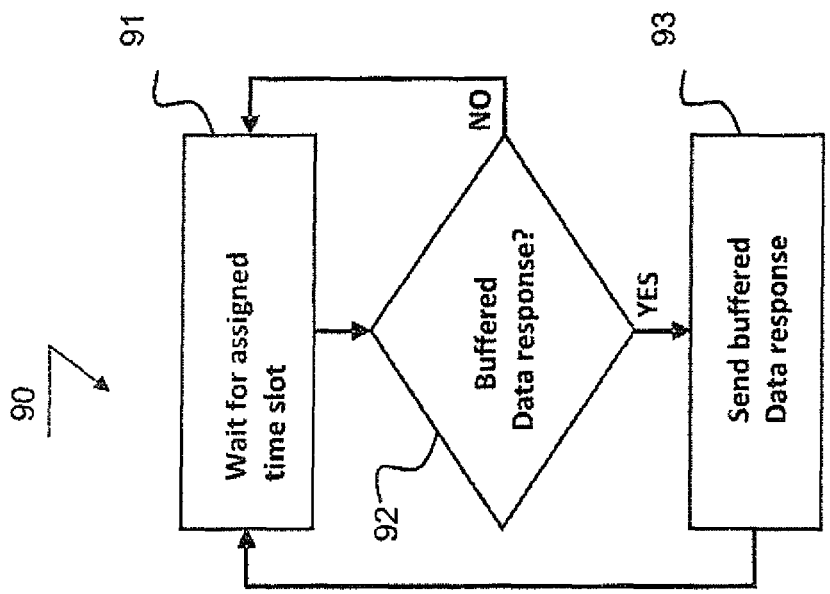
FIG. 9 presents in a schematic way an embodiment of a work flow at the wireless transceiver associated with the sensor unit.

FIG. 9 presents in a schematic way an embodiment of a work flow at the wireless transceiver associated with the sensor unit as described in the previous figure.

Item 91: The Wireless Transceiver module of the sensor unit waits for the assigned timeslot.

Item 92: The Wireless Transceiver module checks whether a Data indication was buffered. If the Data indication was buffered, the next timeslot is awaited. If no Data indication was buffered the transceiver module keeps waiting.

Item 93: The Wireless Transceiver module transmits the buffered Data indication and returns to waiting for the next assigned timeslot.

Figure 10:
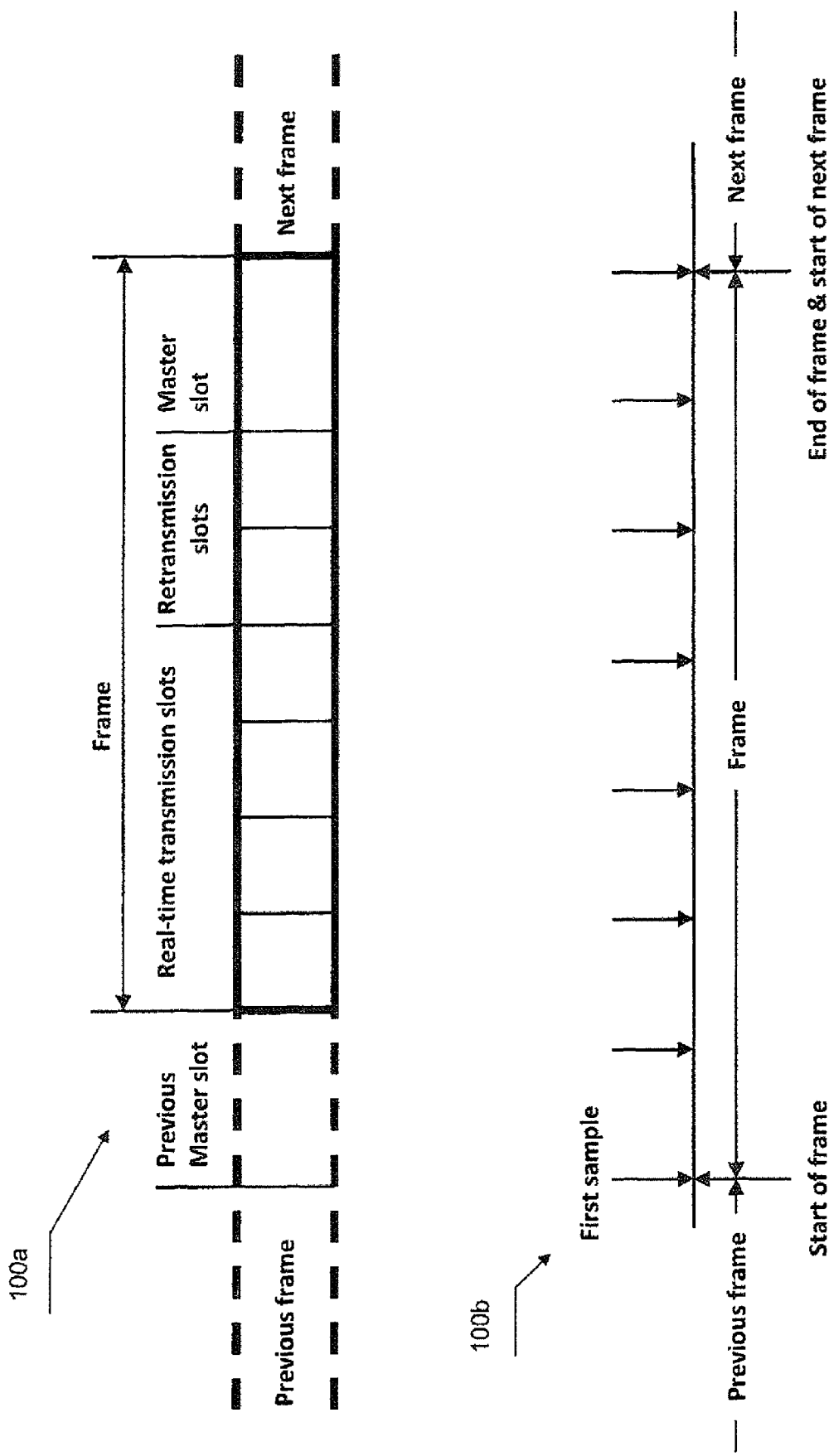
FIG. 10 presents in a schematic way an embodiment of retransmission slots.

FIG. 10 presents in a schematic way an embodiment of retransmission slots. It will be appreciated that embodiments discussed with reference to the previous figures did not contemplate retransmissions of missing intervals. If a transmission failed, the master unit can still obtain an accurate real-time value of the quantity of interest because the interval over which the integration value was determined is doubled at the sensor unit. This is illustrated in the following example:

1. Successful transmission of $v(\tau_0,\tau_1)$ and the value is processed at the master unit.

2. Failed transmission of $v(\tau_0,\tau_2)$. No processing of new data at the master unit.

3. Successful transmission $v(\tau_0,\tau_3)$. This value is used by the processing at the master unit. Since no information is lost, the value $v(\tau_0,\tau_2)$ is incorporated in the transmitted value the further processing at the master unit can continue without the need for a re-initialization of the processing.

So, in general, for real-time processing no retransmission is required in a sense that the same integration value is retransmitted. Also, the necessity for retransmission will require reserving time and thereby reducing the capacity of the wireless system as a whole.

However, for recording purposes no hard real-time requirement exists. So, if in the example the value $v(\tau_1,\tau_2)$ is required for recording, it must be retransmitted.

How this is achieved while at the same time keeping the possibility of real-time visualization is described in the following sections.

Besides assigning a timeslot to each sensor unit, also a number of retransmission timeslots may be made available. The number of retransmission timeslots is a parameter of the set-up and can differ from one application to the other.

The master unit slot may be placed at then end of the frame to report the result of both the transmissions and the retransmissions back to the sensor units. The resulting frame layout may be as is schematically depicted in view 100a, wherein each frame is provided with real-time retransmission slots, retransmission slots and a master unit slot for broadcasting.

The assigned timeslots for each sensor unit can be seen as the real-time transmission slots. These slots and the master unit slot are filled in the same manner as described with reference to previous embodiments.

Figure 11:
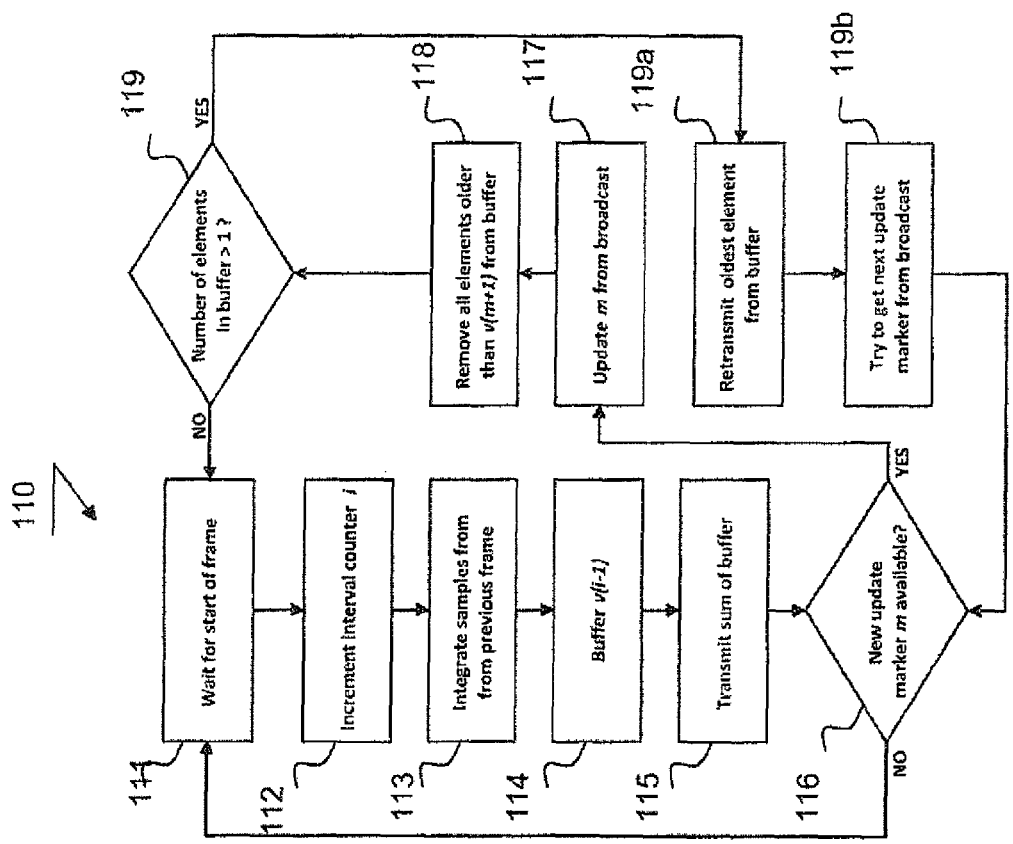
FIG. 11 presents in a schematic way an embodiment of a flow at the sensor unit for enabling retransmission.

FIG. 11 presents in a schematic way a preferred embodiment of a flow at the sensor unit for enabling retransmission.

For ease of notation consider the integration value resulting from the integration of all the samples in the frame to be denoted as $V_i=v(\tau_{1,i},\tau_{N,i})$, with:

$\tau_{1,i}$ the timestamp of the first sample in frame i that corresponds to the start of the frame.

$\tau_{N,i}$ the timestamp of the last sample in frame i that corresponds to the end of the frame.

This means that N samples fit in a frame and $\tau_{1,i}=\tau_{N,i-1}$ and $\tau_{N,i}=\tau_{1,i+1}$ as is illustrated in FIG. 10, item 100b. A sensor unit can receive the last sequence number that was recorded from the master unit broadcast; the update marker. View 100b schematically depicts an embodiment when the sampling moments coincide with the respective begins and end of the frame.

The flow at the sensor unit is as follows:

Item 111: The sequence starts at the start of the frame.

Item 112: A frame, or interval counter i is maintained and incremented every frame.

Item 113: The samples from start to end of the previous frame are integrated.

Item 114: The corresponding integration value v(i−1) is buffered.

Item 115: The sum of all the elements in the buffer, i.e. from the first element v(b) (where b is the sequence number of the first element in the buffer) to the last element v(i−1) (that was just buffered) is calculated.

Item 116: If no new update marker m is available, no further retransmission is to be done.

Item 117: The broadcast from the master unit was received and contained the interval counter m indicated up-to which interval the data is up-to-date. It is implicitly assumed here that the value is update upon reception of the broadcast.

Item 118: All elements older than v(m+1) are removed from the buffer.

Item 119: If there is only one element in the buffer, there is no need to retransmit because this is the element that was buffered and transmitted this frame.

Item 119a: The oldest element in the buffer is retransmitted.

Item 119b: To handle cases in which the master unit might have transmitted in its message more update markers for the sensor unit, it is tried to get a new update marker from the broadcast and the flow returns to step 6 where the result is checked.

With the retransmission in place, there can be a large number of combinations. To give an example the following scenario may be considered:

1. Successful transmission of v(0,1) thus real-time processing and recording of v(0,1) and the master unit indicates 1.

2. Failed transmission of v(1,2) and thus the master unit indicates 1.

3. Failed transmission of v(1,3) and failed retransmission of v(1,2). The master unit keeps indicating 1.

4. Successful transmission of v(1,4) and v(1,2) thus real-time processing of v(1,4) and recording of v(1,2). Thus master unit indicates 2 for the recording and 4 for the real-time processing.

5. Successful transmission of v(4,5) and retransmission of v(2,3). This results in real-time processing of v(4,5). The value v(2,3) is recorded. However, also is the value v(3,4) that can be constructed via v(3,4)=v(1,4)−v(1,2)−v(2,3). So the master unit will indicate 5 for the real-time processing and 4 for the recording in this, an algorithm to reconstruct the missing values may be implemented.

It will be appreciated that while specific embodiments of the invention have been described above, that the invention may be practiced otherwise than as described. In addition, isolated features discussed with reference to different figures may be combined.

The invention claimed is:

1. A method of enabling a wireless communication between a master unit and at least one sensor unit to be executed within a frame, the at least one sensor unit having a data sampling frequency for sampling one or more of its channels and for storing resulting samples in a buffer memory together with a corresponding sample sequence number, wherein the at least one sensor unit is adapted to transmit an integrated sample to the master unit during a portion of the frame, the method comprising the steps of:

transmitting at least once by the master unit during a master unit portion of the frame a data update request message comprising an identification of an initial sample sequence number from which integration by the at least one sensor unit has to be carried out;

integrating by the at least one sensor unit the sample values from the initial sample sequence number to a current sample sequence number;

transmitting during a further portion of the frame by the at least one sensor unit the integrated sample value and the identification for the current sample sequence number;

receiving by the master unit the integrated sample value and the identification of the current sample sequence number; and storing in the master unit at least the identification of the current sample sequence number.

2. A method according to claim 1, wherein a plurality of wireless sensor units is provided, the method further comprising the steps of:

broadcasting by the master unit a mutual data update request for the plurality of sensor units, said mutual data update request comprising an identification of a mutual initial sample sequence number from which integration of sample values by the sensor units has to be carried out;

assigning a frame portion to each sensor unit within the frame; and transmitting by each sensor unit during its assigned frame portion the integrated sample value and the identification of the initial sample sequence number.

3. A method according to claim 2, wherein sampling moments occurring in accordance with the sampling frequency are synchronized with respective start and end moments of the portions of the frame.

4. A method according to claim 2, for enabling a delayed response to the received broadcast message from the master unit, comprising the steps of:

buffering samples together with their respective sequence numbers in a buffer memory of the sensor unit;

retrieving a sequence number from the broadcast message; and using the samples stored in the buffer memory for generating the integrated value of the variable from the sequence number retrieved from the broadcast message up to the current sequence number.

5. A method according to claim 1, wherein the data update request message is used for transmitting settings data to the at least one sensor unit.

6. A method according to claim 2, adapted for enabling read-out of integrated sample values synchronized in time via the steps of:

recognizing a synchronization event by the sensor units;

retrieving the buffered samples from respective buffer memories of the sensor units except for the last sample; and integrating the respective sample values and wirelessly transmitting the sample values to the master unit.

7. A method according to claim 6, wherein the synchronization event comprises a broadcast data update request message.

8. A method according to claim 1, wherein one or more retransmission slots are assigned per frame, the broadcast message from the master unit comprising a frame counter adapted to indicate the frame number for which data are up to date, said frame counter being updated for each received broadcast message, the method further comprising the step of: removing data from the buffer up to the frame corresponding to the received frame number; and retransmitting data corresponding to the oldest sample remaining in the buffer.

9. A method according to claim 8, wherein the retransmission slots are shared by the sensor units, the method further comprising the step of: indicating in the broadcasting message in which order the sensor units are to transmit their individual data.

10. A method according to claim 1, further comprising the steps of:
for every sensor unit storing integration intervals and corresponding integrated sample values in a dataset;
decreasing the dataset upon an event of data recording; and
combining pairs of known integration value for determining a missing interval value, said determination being enabled in accordance with a pre-determined rule.

11. A method according to claim 10, wherein the master unit is arranged to enable recording and real-time visualization via the steps of:
tracking by the master unit the sequence number of the last interval that was recorded;
tracking by the master unit the sequence number of the last real-time visualization, evaluating the dataset for each transmission received from a sensor unit; enabling visualisation for each known dataset entry; and
enabling recording when the first element in the dataset is known.

12. A method according to claim 1, wherein the sampling frequency is pre-determined.

13. A method according to claim 12, wherein the sampling frequency of the data channels in the sensor unit is 0.5 kHz or higher and the measured data is processed to detect pre-defined events in the data within the transmission interval.

14. A method according to claim 1, wherein the at least one sensor unit is adapted to integrate the samples over time.

15. A system comprising a master unit and at least one sensor unit, wherein the master unit and the at least one sensor unit are arranged to communicate using a wireless communication, said at least one sensor unit having one or more channels and a buffer memory and being further arranged for sampling the one or more of its channels with a data sampling frequency and for storing resulting sample in the buffer memory together with a corresponding sample sequence number, wherein the at least one sensor unit is further arranged to transmit an integrated sample to the master unit during a portion of the frame, wherein:
the master unit is adapted to transmit during a master unit portion of the frame a data update request message comprising an identification of an initial sample sequence number from which integration by the at least one sensor unit has to be carried out;
the at least one sensor unit is adapted to integrate the sample values from the initial sample sequence number to a current sample sequence number and to transmit during a further portion of the frame the integrated sample value and the identification for the current sample sequence number; and
the master unit is further adapted to receive the integrated sample value and the identification of the current sample sequence number and to store at least the identification of the current sample sequence number.

* * * * *